United States Patent [19]

Tenfjord

[11] 3,995,536

[45] Dec. 7, 1976

[54] OSCILLATING FLUID-DRIVEN ACTUATOR

[75] Inventor: Jens Karl Tenfjord, Tennfjord, Norway

[73] Assignee: Johan Tenfjord Mek. Verksted, Norway

[22] Filed: Nov. 5, 1974

[21] Appl. No.: 521,212

[30] Foreign Application Priority Data

Nov. 29, 1973 Norway .............................. 4558/73

[52] U.S. Cl. .................................. 92/120; 92/167; 92/255; 308/15

[51] Int. Cl.² ........................ F01C 9/00; F16J 1/00

[58] Field of Search ............ 92/120, 121, 122, 123, 92/124, 125, 166; 308/15, 22, 157, 139, 134.1, 174, 227

[56] References Cited

UNITED STATES PATENTS

| | | | |
|---|---|---|---|
| 3,032,020 | 5/1962 | Sneen | 92/122 |
| 3,281,065 | 10/1966 | Chaffiotte | 92/120 |
| 3,446,120 | 5/1969 | Sneen | 92/120 |
| 3,563,619 | 2/1971 | Evans | 308/15 |

*Primary Examiner*—Paul L. Maslousky
*Attorney, Agent, or Firm*—William Anthony Drucker

[57] ABSTRACT

An oscillating fluid-driven actuator for a shaft, such as a ship rudder shaft, a butterfly valve spindle or the like. The actuator comprises (i) a stationary actuator housing defining an annular chamber coaxial with the shaft and having a suitable cross section, and (ii) an annular piston arranged coaxially with the shaft in the chamber and connected fixedly with the shaft by means of an arm mounted intermediate the ends of the annular piston by means of a central piston hub. The piston hub is made with a coaxial bearing surface or surfaces of convex spherical shape and the actuator housing has a central lower hollow hub defining an inner concave spherical bearing surface to support the piston hub by engagement with the spherical surface thereof. A corresponding concave spherical bearing surface is arranged in the upper portion of the housing to cooperate with the corresponding spherical surface of the upper portion of the hub. To allow an exact adjustment when mounting the actuator on a base structure and the shaft, the shaft and the bore of the piston hub are made cylindrical, and there is a substantial radial clearance gap therebetween. Radially expanding ring means are arranged in the radial gap to secure the piston to the shaft.

7 Claims, 3 Drawing Figures

OSCILLATING FLUID-DRIVEN ACTUATOR

This invention relates to an oscillating fluid-driven actuator, for a driving shaft, of the kind having (i) a stationary actuator housing defining an annular segment-shaped chamber of suitable cross sectional shape and coaxial with the shaft, and (ii) an annular segment-shaped piston arranged coaxially with the shaft in the chamber and fixedly connected with the shaft by means of a central hub and an arm extending between the hub and a location on the annular piston intermediate the ends thereof, the peripheral or angular extent of the piston being less than 360°. More especially, but not exclusively, the invention relates to an actuator to oscillate the shaft of a ship's rudder.

In previously known actuators, particularly for ship's rudders, a disadvantage has been experienced in that deformations in the ship's structure, extreme movements of the rudder in rough weather, and a less precise adjustment of the actuator mounting any cause problems with the shaft bearings or with the seal between the annular piston and the piston chamber wall. Accordingly, in known rudder actuators, the rudder shaft has to be journalled in bearings with unreasonably large surfaces in order to avoid the transfer of the movements of the rudder shaft to the rudder actuator rotor.

In order to avoid at least some of the above-mentioned problems it has been suggested to provide the annular piston at the ends thereof with separate sealing heads, which are radially displaceable relatively to the piston for self-centering in the piston chamber. It has been found that this solution reduces the difficulties as to the sealing and wear between the piston and the chamber wall but does little or nothing to assist unloading or relieving of the actuator shaft bearings.

It is accordingly the object of the present invention to provide an improved construction of actuator which permits a more free movement between the shaft and the actuator housing. According to the invention this is obtained in that the annular piston hub is provided with outer spherical bearing surfaces cooperating with corresponding spherical bearing surfaces in the actuator housing. The spherical bearing may be made with a lower bearing portion which is so large that it can serve as an axial thrust bearing for the shaft and its accessories, such as a ship's rudder, a butterfly valve rotor, etc., so that a separate thrust bearing or support bearing can be dispensed with. The spherical bearing allows for some inclination of the shaft relative to the actuator housing without subjecting the bearing surface to unreasonable wear.

When assembling the actuator and the shaft it is generally important that the piston hub is adjusted axially correctly relative to the shaft. The conventional manner of securing the hub on the shaft is by use of a conical connection with wedge and nut. Such a connection arrangement is often hardly suitable, as it can be difficult to determine exactly the top level of the actuator base and the relevant length of the shaft when the fitting being used is a cone. For example, when the connection has been tightened, if the shaft becomes too short (or the base too high) the lower bearing of the actuator will be subjected to an additional load. In order to avoid the need for exactly adjusting the hub relative to the shaft a new solution has been found according to the invention, wherein the engagement between the piston hub and the shaft is obtained by means of intermediate sets of radially expandable expansion rings, the shaft portion engaging the hub being cylindrical. When using such expansion rings and making the relevant shaft portion cylindrical (as also the corresponding bore of the hub) all problems as to non-determinable axial displacement and the resulting erroneous load on the bearing are completely avoided.

The bearing is in direct connection with the interior of the actuator housing which is filled with a hydraulic liquid. Accordingly, the bearing lubrication problems have been solved in a very simple manner.

An embodiment of the invention will now be explained in the following description in connection with the accompanying drawing, in which.

Figure 2:
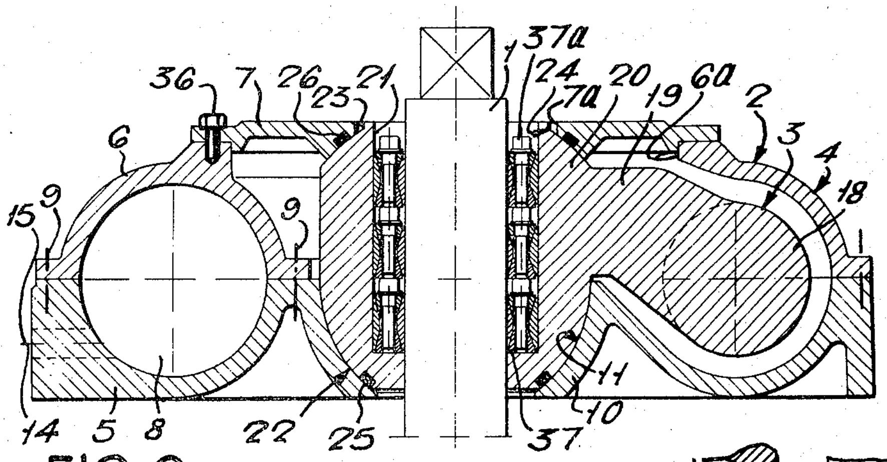
FIG. 2 is a diametrical sectional view through the actuator taken on the line 2—2 in FIG. 1.

In the drawing the driving shaft, which can be a rudder shaft or a butterfly valve spindle, is denoted by 1 and the actuator is generally denoted by 2. The annular piston of the actuator is denoted by 3 and the actuator housing by 4.

Figure 1:
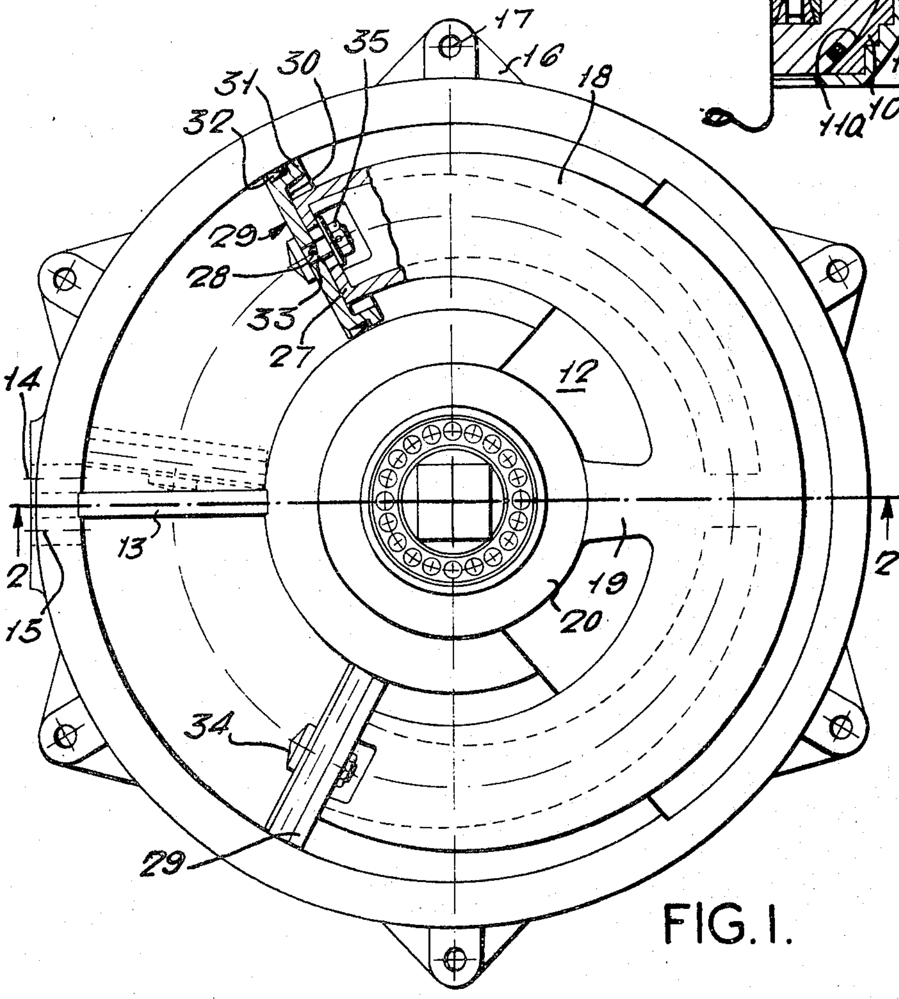
FIG. 1 is a plan view of a fluid-driven, preferably hydraulically driven, actuator according to the invention with the upper housing member removed.

The actuator housing 4 comprises a lower housing member 5, an upper housing member 6 and a top cover 7. The top cover is substantially disc-shaped and has a central opening **7-*a* with a substantially greater diameter than that of the shaft 1. On the underside of the cover 7, and coaxially with the opening 7*a*, there is provided a central concave downwardly facing spherical annular surface 24. The function of this annular bearing surface 24 will be explained below. The lower housing member 5 and the upper housing member 6 each define a half of a toroidal or annular segment-shaped chamber 8. The cover 7 covers a large central opening 6*a* in the top of the upper housing member and is secured thereto by means of bolts 36. The housing members 5 and 6 are bolted together by means of bolts 9 indicated schematically in FIG. 2. The central portion of the lower housing member 5 is shaped as a hollow hub 10 and the cavity of the hub is at least partially shaped with an upwardly facing spherical concave annular surface 11 serving as a bearing surface and the function of which is explained in greater detail in the following. In the upper housing member 6, and if necessary in a portion of the lower housing member 5, there is provided a sector-shaped clearance gap 12, as shown in FIG. 1, for the radial arm 19 (explained below) of the annular piston 3. The angular extent of the clearance gap is about 100°. Diametrically opposite to the vertical central plane of the gap, and in an extension thereof, there is provided a partition wall 13 in the annular piston chamber 8, as shown in FIG. 1. On each side of the partition wall 13 there are provided respective passages 14 and 15 in the lower housing member 5 respectively for supply and removal of hydraulic liquid to and from the respective part of the piston chamber 8. As shown in FIG. 1, the lower housing member 5 is provided with lugs 16 having through-holes 17 for securing to a base. It should be noted that the upper casing member 6 and the top cover 7** may be made as a single integral piece.

The annular segment-shaped piston 3 has a segment-shaped piston body 18 extending over an angle of about 200°. In the centre thereof, the piston body is fixedly connected to or made integral with an arm 19 extending substantially radially from a piston hub 20 arranged centrally in the actuator housing. The hub 20 has a central cylindrical bore 21 with substantially greater diameter than that of the shaft 1 and has on the outer side thereof a lower spherical annular surface portion 22 and an upper spherical annular surface portion 23. The lower annular surface portion 22 engages or abuts the bearing surface 11 of the lower casing member 5 and the upper annular surface portion 23 cooperates with the correspondingly shaped bearing surface 24 in the top cover 7 of the upper housing member 6. Said lower bearing surfaces 11, 22 and upper bearing surfaces 23, 24 have a common centre of rotation but their radii of curvation may be different for the lower and the upper surfaces. Sealing means 25, 26 of suitable material and shape are provided in grooves in the lower portion of the hub 20 and in the top cover 7, respectively, to prevent liquid leakage from the actuator housing and the piston bearing.

In the piston hub bore 21 there are provided three expansion ring mountings 37 vertically spaced on the shaft 1 to secure the hub 20 fixedly on the shaft. Such expansion ring mountings are known per se and each mounting comprises an inner and an outer split ring, said rings having double symmetrical conical surfaces or wedge surfaces facing the corresponding surfaces on the other ring. Two intermediate rings or expansion rings having a height less than a half of the first-mentioned rings are provided between the inner and the outer rings and have wedge surfaces cooperating with the wedge surfaces of the inner and the outer rings. The two intermediate rings can be pulled towards one another by means of screw bolts 37*a* to force the inner ring and the outer ring of the mounting away from each other in the radial direction so that the inner ring engages the surface of the shaft 1 and the outer ring engages the inner surface of the hub bore 21 (FIG. 2). When using such a mounting connection there is no need to provide the shaft and the hub with conical surfaces and grooves for wedges to cooperate therewith. Thus, the shaft may be easily connected with the hub without running a risk that the shaft and the hub (and the piston) are displaced axially relatively to one another during the mounting operation. The connection is very safe and easy to mount and dismount.

The annular piston body 18 is hollow and ends in radially extending planar end walls 27. In the end wall there is provided a through-hole 28. At each end the piston body supports a piston head or sealing head 29 in the shape of a shallow cup having a planar bottom surface 30 and an inner diameter substantially larger than that of the piston body 18. The skirt 31 of the sealing head 29 is provided with a peripheral groove accommodating a lip ring seal 32. A bolt 33 with a bolt head 34 is passed through a central hole in the bottom of the sealing head 29 and through the hole 28 in the end wall 27. The end portion of the bolt is provided with threads and projects into the piston body. On the inner side of the end wall 27 there are arranged a washer and a nut 25 to keep the sealing head in position so that the head is radially displaceable in the piston chamber. The annular segment-shaped chamber 8 and also the piston 3 may have a cross sectional shape other than circular. In the present Applicants' Norwegian patent 84 554 there is shown an actuator having a piston with square cross section. Of course, the sealing head 29 will then have a corresponding substantially square configuration.

In FIG. 2, the lower bearing surface 11 is substantially greater than the upper bearing surface 24. It acts as an axial thrust bearing surface and takes up the weight of the shaft and the accessories supported thereby. It is pointed out that the hub portion 10 of the lower housing member 5 may be a separate member secured to the housing member 5, e.g. by means of flanges and screw bolts.

Figure 3:
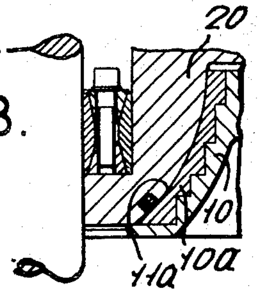
FIG. 3 shows a modified detail of FIG. 2.

According to FIG. 3, which shows a modified detail of FIG. 2, the lower bearing surface 11*a* is provided in a separate bearing liner cap 10*a* centrally mounted in a correspondingly step-shaped cavity in the hub portion 10 of the lower housing member 5.

When in operation, the whole interior of the actuator housing 4 is filled with hydraulic liquid which also lubricates the spherical bearing surfaces.

It will appear from above description that the shaft 1 is mounted in the piston hub 20 spherically journalled in the actuator housing 4, and the latter is secured to a support structure (not shown). Minor deformations in the support structure cannot be detrimental to the operation of the bearing. When the support structure, and thus also the housing 4, changes its position relative to the shaft 1, the sealing heads 29 displace themselves radially. As the shaft 1 is journalled spherically in the actuator housing the shaft maintains its original position, and so also does the piston body 18.

I claim:

1. In an oscillating fluid-driven actuator for a driving shaft, of the kind having i. an actuator housing comprising upper and lower housing members having an internal face defining an annular segment-shaped chamber substantially coaxial with the shaft ii. an annular segment-shaped piston arranged coaxially with the shaft in the chamber and fixedly connected to the shaft by a central hub having an axis of rotation, and iii. an arm extending between the hub and the annular piston at a point of said annular piston intermediate its ends, the peripheral extent of the piston being less than 360°, the improvement in which, in combination:

a. said hub of said annular segment-shaped piston has a spherical convex bearing surface which is opposed to and in sliding contact with a corresponding concave spherical bearing surface in said actuator housing, said convex bearing surface and said concave bearing surface both having their centre lying on the axis of rotation of the hub, b. said piston includes an annular segment-shaped piston body spaced from said internal face of said housing c. said piston includes a respective sealing head at each circumferential end of said piston body and in sealing engagement with said internal face and slidable along said internal face, d. said piston includes respective means mounting each sealing head on an end of said piston body, said mounting means being constructed to permit movement of the sealing head within limits relative to the piston in a respective radial plane containing the axis of the hub, said upper housing member having a central top opening, and wherein there is provided a cover covering said top opening, and an upper housing bearing surface being provided on said cover coooperating directly with said hub whereby movements of said shaft and piston, out of coaxiality with said housing, can take place by relative movement between said piston body and sealing heads.

2. In an oscillating fluid-driven actuator for a driving shaft, as claimed in claim 1, said members being connected to each other in a horizontal plane extending perpendicularly to the axis of said shaft, and said members together defining said annular segment-shaped chamber, the improvement in which:

a. said lower housing member has a central concave upwardly facing spherical bearing surface;

b. said upper housing member has a central concave downwardly facing spherical bearing surface, and c. said piston hub has a central lower spherical bearing surface and a central upper spherical bearing surface, both said surfaces of said piston hub being convex and cooperating with the corresponding said surface of said housing.

3. An oscillating fluid-driven actuator for a driving shaft, as claimed in claim 2, wherein said lower housing member has a central hollow hub portion, and said lower spherical bearing surface is arranged in said hub portion.

4. An oscillating fluid-driven actuator for a driving shaft, as claimed in claim 2, wherein said spherical bearing in said lower housing member has a bearing surface sufficiently large to serve as an axial thrust bearing for said driving shaft and for accessories supported by said driving shaft.

5. An oscillating fluid-driven actuator, as claimed in claim 1, having coaxial grooves in the bearing surfaces of said piston hub and on the bearing surface in said actuator housing, and sealing means accommodated in said grooves to prevent liquid leakage from said actuator housing.

6. An oscillating fluid-driven actuator, as claimed in claim 1 including radially expandable expansion rings positioned intermediate said shaft and said hub of said piston to mount said hub on said shaft, said piston hub having a cylindrical bore and said shaft being in engagement with said hub in said cylindrical bore.

7. An oscillating fluid-driven actuator, as claimed in claim 2 including a separate liner cup mounted centrally in a correspondingly shaped cavity in the central portion of said lower housing member to provide said lower bearing surface.

* * * * *